United States Patent [19]
Kirk

[11] 3,744,028
[45] July 3, 1973

[54] DISCRETE CONTROLLER
[75] Inventor: Robert T. Kirk, Ogden, Utah
[73] Assignee: Eaton Corporation, Cleveland, Ohio
[22] Filed: Mar. 1, 1972
[21] Appl. No.: 230,706

[52] U.S. Cl. ............................................ 340/172.5
[51] Int. Cl. ............................................. G06f 3/00
[58] Field of Search ............................... 340/172.5

[56] References Cited
UNITED STATES PATENTS
| | | | |
|---|---|---|---|
| 3,597,743 | 8/1971 | Murphy | 340/172.5 |
| 3,673,576 | 6/1972 | Donaldson | 340/172.5 |
| 3,201,733 | 10/1965 | Terzian | 340/172.5 |
| 3,274,561 | 9/1966 | Hallman | 340/172.5 |
| 3,283,308 | 11/1966 | Klein | 340/172.5 |
| 3,407,387 | 10/1968 | Looschen | 340/172.5 X |
| 3,514,758 | 5/1970 | Bennett | 340/172.5 |

*Primary Examiner*—Paul J. Henon
*Assistant Examiner*—Sydney R. Chirlin
*Attorney*—Lynn G. Foster

[57] ABSTRACT

A discrete controller for interfacing between a computer and a plurality of discrete devices, said discrete controller comprising a plurality of line driver cards each interfacing with a respective plurality of computer-switchable discrete devices; a plurality of line receiver cards each interfacing with a respective plurality of signal-generating discrete devices; and a control module interfacing between said computer and said line driver and line receiver cards.

9 Claims, 4 Drawing Figures

DISCRETE CONTROLLER

BACKGROUND

1. Field of Invention

This invention relates to automatic control systems and is particularly directed to discrete controllers for controlling communications between a central control source and a plurality of discrete devices.

In computer supervised automatic control systems, discrete devices may be considered as any bistable device which either is switched by the computer or which is switched by external means and serves to indicate to the computer that such switching has occurred. Relay switches and indicator lights are examples of discrete devices which are switched by the computer, while limit switches and thermocouples are examples of discrete devices which are switched by external means and serve to indicate to the computer that such switching has occurred.

2. Prior Art

Obviously, most automatic control systems include a plurality of discrete devices and some means must be provided to permit the computer to monitor those discrete devices which indicate switching by external means and to be able to transmit signals to those discrete devices whose switching is controlled by the computer. Numerous techniques have been proposed heretofore for accomplishing this. However, none of the prior art systems have been entirely satisfactory. Some of the prior art systems have required excessive utilization of the input/output facilities of the computer. Other systems have provided inadequate monitoring of the signal generating discrete devices. Still other systems have been able to interface with only a relatively small number of discrete devices, while yet other systems have been complex and expensive.

BRIEF SUMMARY AND OBJECTS OF INVENTION

These disadvantages of the prior art are overcome with the present invention and a discrete controller is provided which effectively provides constant communication between the computer and a relatively large number of discrete devices while requiring minimal utilization of the input/output facilities of the computer. In addition, the system of the present invention is relatively simple and inexpensive.

The advantages of the present invention are preferably attained by providing a plurality of line driver and line receiver cards, each of which is capable of interfacing with up to sixteen discrete devices, together with a control module which is capable of interfacing with up to 128 line driver cards plus up to 128 line receiver cards. The control module includes a counter which receives command words from the computer and transfers these words, as the counter counts down, to a decoder which decodes the address of the particular discrete device to be switched and passes a signal to accomplish the desired switching. Signals from the signal generating discrete devices are repeatedly sampled by the computer. The signals obtained in each sample are stored and the present value is compared with the stored value from the previous sampling. Detection of change in the total generates an interrupt request to the computer and, when the interrupt request is acknowledged, the discrete devices are polled to identify which discrete device has been switched.

Accordingly, it is an object of the present invention to provide improved means for interfacing between a computer and a plurality of discrete devices.

Another object of the present invention is to provide an improved discrete controller for interfacing between a computer and a plurality of discrete devices.

An additional object of the present invention is to provide a discrete controller which provides effectively constant communication between each of a plurality of signal generating discrete devices and a computer.

A specific object of the present invention is to provide a discrete controller for interfacing between a computer and a plurality of discrete devices, said discrete controller comprising a plurality of line drive cards each interfacing with a respective plurality of computer-switchable discrete devices; a plurality of line receiver cards each interfacing with a respective plurality of signal-generating discrete devices; and a control module comprising a counter connected to receive command words from a computer, a decoder connected to sequentially receive said command words from said counter as said counter is clocked and serving to decode the address of a particular discrete device to be switched and to pass a signal to switch said particular discrete device; said line receiver card comprises means responsive to sampling by the computer of the signals from a plurality of signal generating discrete devices, register means for storing the signals obtained during each sample of said sampling means, comparator means for comparing the signals obtained by said sampling means during each sampling with the signals stored in said register during the preceding sampling, interrupt request means operable to generate an interrupt request to said computer in response to an inequality signal from said comparator means, and means responsive to acknowledgment of said interrupt request by said computer to transfer data from said signal-generating discrete devices to said computer.

These and other objects and features of the present invention will be apparent from the following detailed description, taken with reference to the accompanying drawings.

DETAILED DESCRIPTION OF ILLUSTRATED EMBODIMENT

Figure 1:
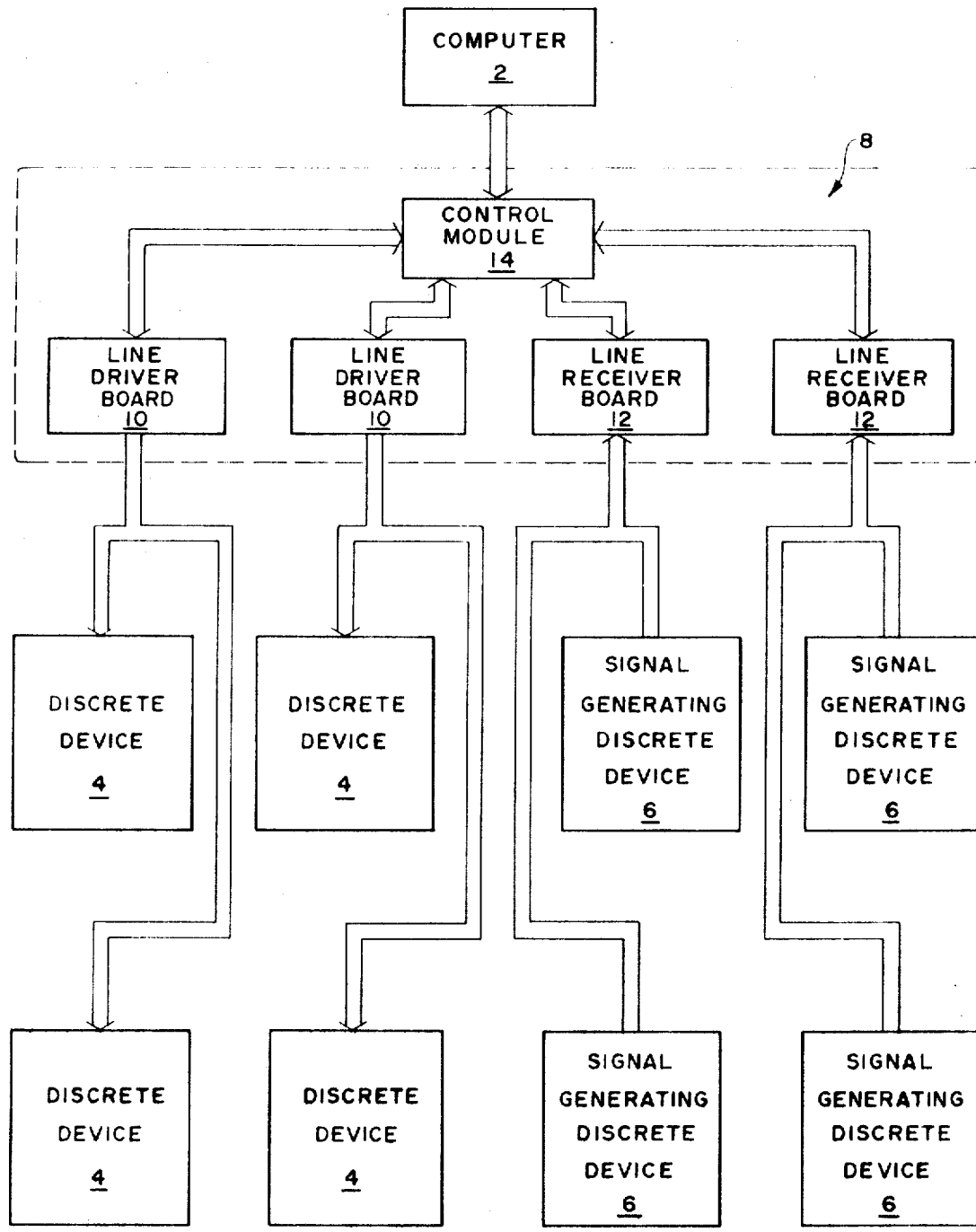
FIG. 1 is a diagrammatic representation of an automatic control system embodying the present invention.

In that form of the present invention chosen for purposes of illustration, FIG. 1 shows an automatic control system comprising a computer 2, a plurality of discrete devices 4 controlled by the computer 2, a plurality of signal generating discrete devices 6, and a discrete controller 8 interfacing between the computer 2 and the discrete devices 4 and 6. As shown, the discrete controller 8 comprises a plurality of line driver boards 10, each interfacing with a respective plurality of the computer-controlled discrete devices 4. In addition, the discrete controller 8 comprises a plurality of line receiver boards 12, each interfacing with a respective plurality of the signal generating discrete devices 6. Finally, a control module 14 interfaces between the computer 2 and all of the discrete devices 4 and 6 through the line driver boards 10 and line receiver boards 12.

Figure 3:
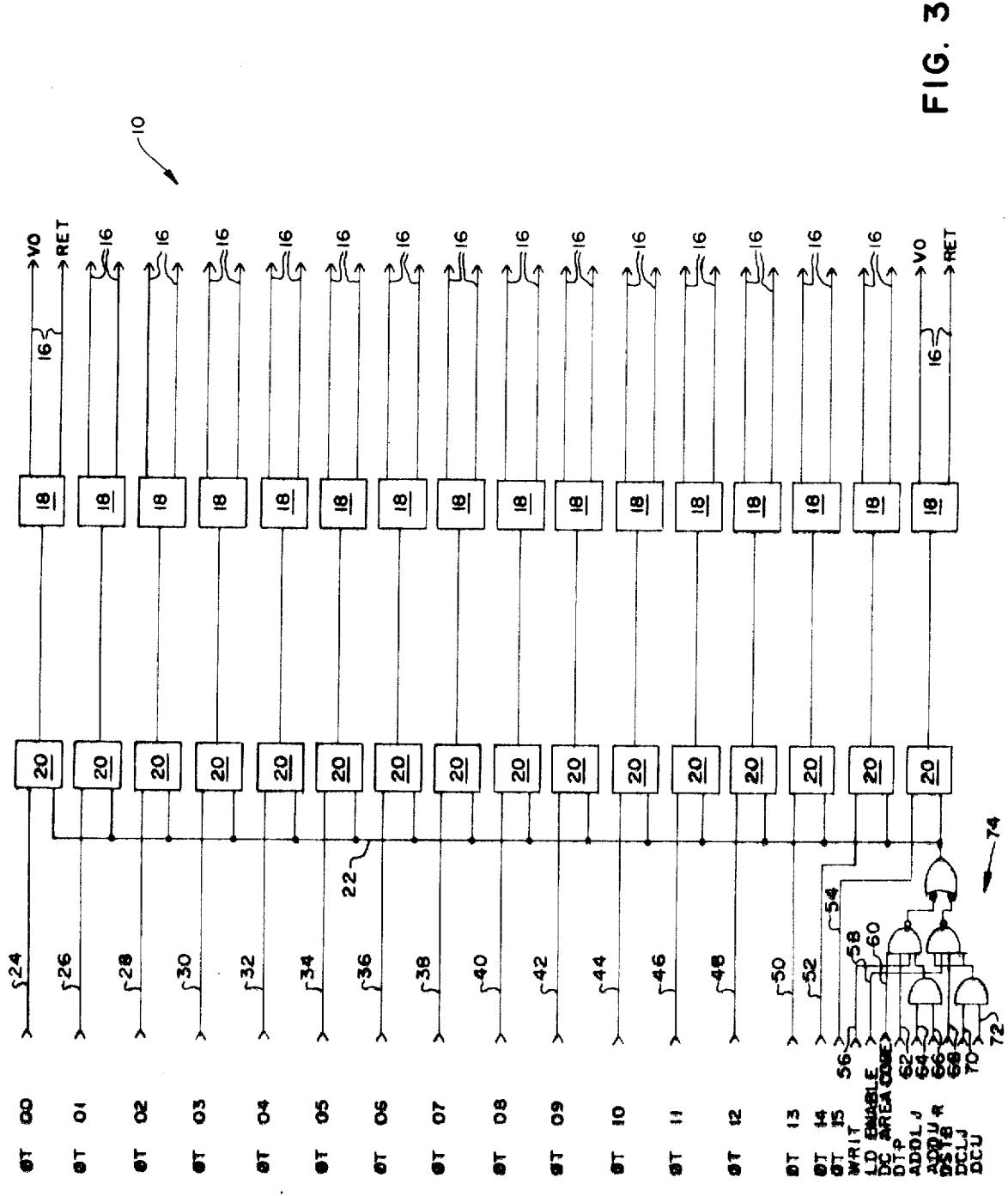
FIG. 3 is a circuit diagram of a line driver card employed in the discrete controller of FIG. 1.

FIG. 3 illustrates the circuitry of the line driver boards 10. Each of the line driver boards 10 is identical. As indicated above, the control module 14 can interface with up to 128 of the line driver cards 10, and each of the line driver cards 10 can interface with up to sixteen of the computer-controlled discrete devices 4 via respective conductor pairs 16, which serve as outputs from switches 18. Each of the switches 18 is energizable through a respective one of the gates 20. Each of the gates 20 has one of its inputs connected to a common conductor 22, while the other of its inputs 24-54 is connected to a respective data conductor of the computer 2, as indicated at 0T 00 to 0T 15. As noted above, the control module 14 can interface with up to 128 line driver cards 10, simultaneously, and it should be understood that each of these 128 line driver cards 10 comprises a gate 20 having an input 24 connected to data conductor 0T 00 of the computer 2. Similarly, each of the 128 line driver cards 10 comprises a second gate 20 having an input 26 connected to the data conductor 0T 01 of the computer 2. Stated another way, the data conductor 0T 00 of computer 2 is connected to inputs 24 on all 128 of the line driver cards 10. Consequently, for example, if the computer 2 applies a switching pulse to data conductor 0T 08, this pulse will appear simultaneously on the inputs 40 of all 128 of the line driver cards 10 and will be applied to the gates 20 associated therewith on all 128 of the line driver cards 10. However, at the same time, the computer will send an "Initiatee Write" command through the control module 14 and this command will include address designations which will be decoded by the control module 14 and applied to one particular line driver card 10 via inputs 56-72 which are combined by AND gates 74 to energize conductor 22. Thus, although input 40 is energized for all 128 of the line driver cards 10, conductor 22 will be energized only for one particular line driver card 10. Thus, the gate 20 associated with input 40 will be actuated only on that particular line driver cord 10 which was designated by the computer 2. Photocoupling is preferably used to decouple the line driver cards 10 from the computer-controlled discrete device 4.

Figure 4:
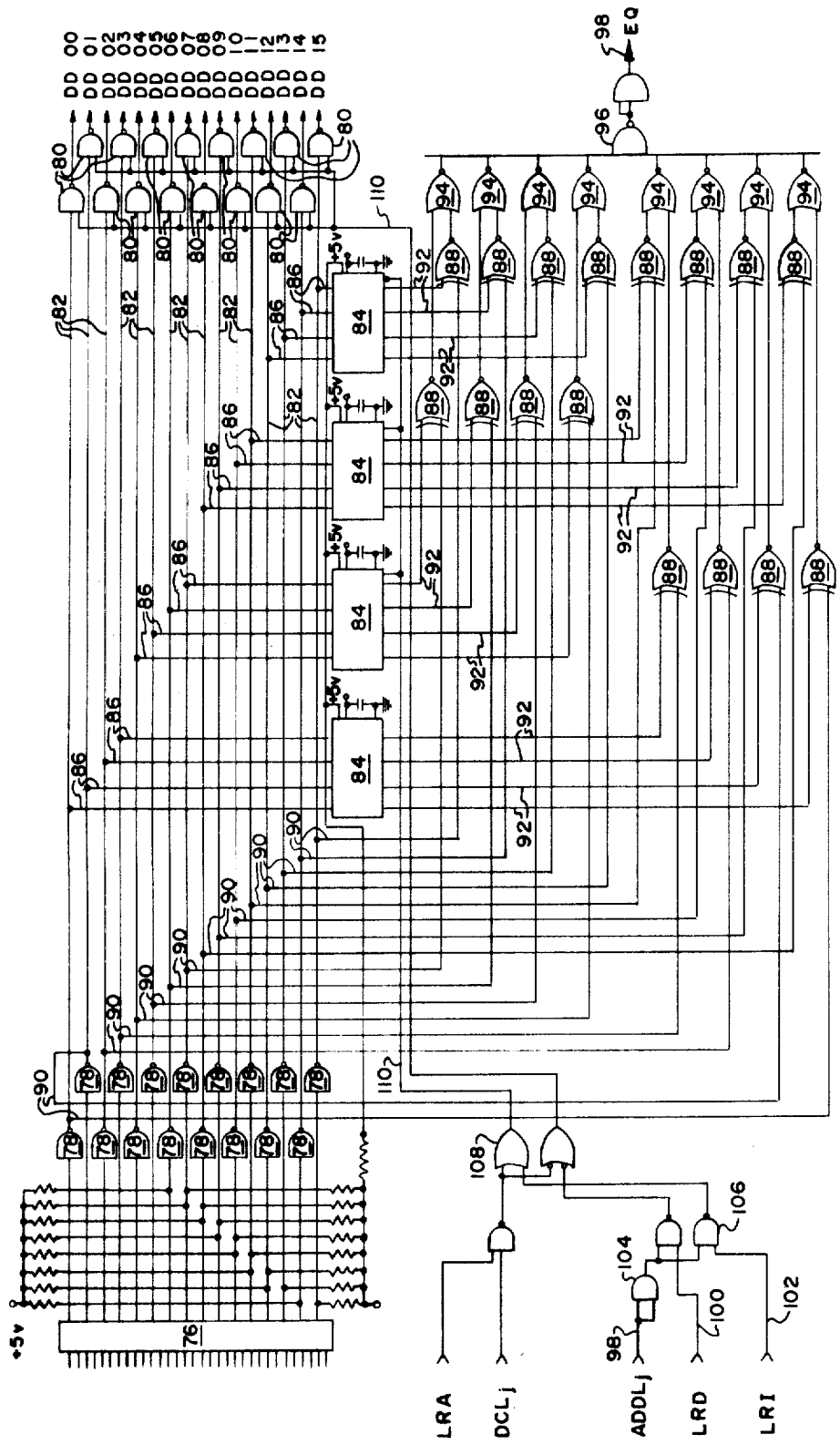
FIG. 4 is a circuit diagram of a line receiver card employed in the discrete controller of FIG. 1.

FIG. 4 is a circuit diagram of one of the line receiver cards 12 of the discrete controller 8. Each of the line receiver boards 12 is identical and, as indicated above, the control module 14 can interface with up to 128 of the line receiver boards 12 and each of the line receiver boards 12 can interface with up to sixteen of the signal generating discrete devices 6. Each of the discrete devices 6 is connected to a respective pair of inputs of a photocoupling means 76 and is coupled thereby to drive a respective one of a plurality of Schmidt triggers 78. The photocoupling means 76 serves to isolate the logic circuitry of the computer 2 from electrical noise and is discussed in detail in the copending application of Logan L. Pease and Robert W. Huggins, Jr., Ser. No. 161,470, filed July 12, 1971, entitled "Photocoupling Line Isolation" and assigned to the assignee of the present application. The signals from the Schmidt triggers 78 are applied simultaneously to respective output gates 80 via conductors 82, to registers 84 via conductors 86, and to one input of respective comparators 88 via conductors 90. The registers 84 store the signals from the Schmidt triggers 78 for one clock pulse and then apply them to the second input 92 of the respective comparators 88. Thus, the comparators 88 serve to compare the present state of the discrete devices 6, as indicated by the signals on inputs 90, with the previous valve, indicated by the signals on inputs 92. Any difference will cause the respective comparator 88 to pass a signal through OR gates 94 and 96 to output 98 which is applied to the computer 2 as an interrupt request. When the computer 2 is ready to accept data from the discrete devices 6, it issues a "SENSE DEVICE" signal which includes the address designation of the line receiver board 12 which issued the interrupt request. These signals are applied through inputs 98, 100 and 102, AND gates 104 AND 106, OR gate 108 and conductor 110 to trigger output gates 80 to pass their data to the computer 2.

Figure 2:
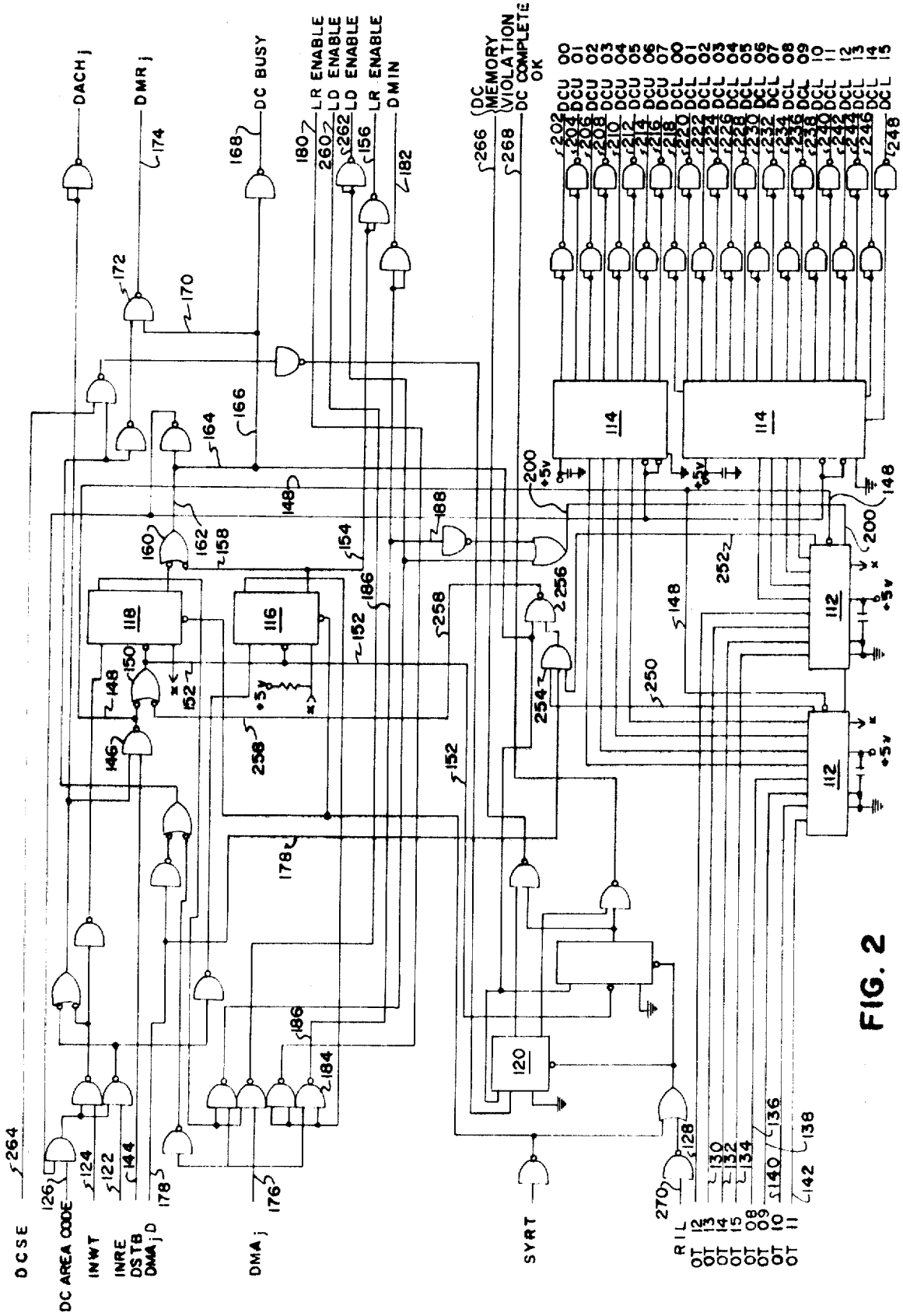
FIG. 2 is a circuit diagram of the control module of the discrete controller of FIG. 1.

FIG. 2 illustrates the circuitry of the control module 14 of the discrete controller 8. As indicated above, the control module 14 interfaces with up to 128 line driver cards 10 plus up to 128 line receiver cards 12. The function of the control module 14 is to decode the address designations contained in the computer commands and to route the computer commands to the appropriate one of the line driver boards 10 or line receiver boards 12. As shown, the control module 14 comprises a register 112; a decoder 114, a "READ" flip-flop 116, a "WRITE" flip-flop 118, and a DCSE flip-flop 120.

In use, the computer 2 issues an "Initialize Read" or "Initialize Write" command, on input 122 or 124, together with the discrete controller area code, on input 126, and the modifier code, on inputs 128-142. Next, the computer 2 issues a DSTB pulse on input 144 which acts through AND gate 146 and conductor 148 to cause register 112 to accept the signals from inputs 128-142, and acts through OR gate 150 and conductor 152 to commence the operation. Where the computer 2 wishes to read the status of the signal generating discrete devices 6, it issues an "Initialize Read" command, applying signals to inputs 122, 126, 128-142 and 144. The signals on inputs 122, 126 and 144 act through AND gate 146 and conductor 148 to cause register 112 to accept the signals on inputs 128-142 and also act through OR gate 150 and conductor 152 to set the "READ" flip-flop 116. Setting of flip-flop 116 acts through conductor 154 to set the line receiver enable output 156 and acts through conductor 158, OR gate 160, conductors 162, 164 and 166 to set the discrete controller busy output 168 and, through conductor 170 and AND gate 172 to send a direct memory request signal via output 174 to the computer 2. When the computer 2 is ready to accept the data, the computer 2 applies a direct memory access signal to input 176 and, after a predetermined time delay, applies the same signal to input 178. These signals reset the signal on output 174, and sets output 182 to indicate to the computer 2 that data is being transferred into its memory. In addition, the signals are applied via AND gate 184, conductors 186, 188 and 200 to clock register 112 to pass the data from inputs 128-142 to decoder 114. The decoder 114 decodes these signals to derive the address designation of the particular line receiver board 12 which has data to transmit. These address designations appear as signals on appropriate ones of the outputs 202-248. This action is repeated to allow the computer 2 to poll the signal generating discrete devices 6 until the register 112 reaches zero, whereupon register 112 passes a signal via conductors 178, 250 and 252, AND gates 254 and 256, and conductor 258 to reset "READ" flip-flop 116. An "Initiate Write" command is carried out similarly, except that the "WRITE" flip-flop 118 energizes the line driver boards 10 via outputs 260 and 262.

Should the discrete controller attempt to transfer data into or out of an erroneous position in the computer memory, the computer 2 applies a signal to input 264 which sets DCSE flip-flop 120. When the data transfer has been completed, if flip-flop 120 is set, a signal appears on output 266, whereas, if flip-flop 120 has not been set, a signal appears on output 268 to indicate that the data transfer has been successfully completed. Upon receipt of this signal, the computer 2 applies a signal to input 270 to reset the discrete controller for another operation.

Obviously, numerous variations and modifications may be made without departing from the present invention. Accordingly, it should be clearly understood that the form of the present invention described above and shown in the accompanying drawings is illustrative only and is not intended to limit the scope of the present invention.

What is claimed is:

1. A discrete controller for interfacing between a computer and a plurality of discrete devices, said discrete controller comprising:
    a plurality of line drive cards each interfacing with a respective plurality of computer-switchable discrete devices;
    a plurality of line receiver cards each interfacing with a respective plurality of signal-generating discrete devices;
    a control module interfacing between said computer and said line driver and line receiver cards; wherein said line receiver cards each comprise:
    means responsive to sampling by the computer of the signals from said plurality of signal generating discrete devices;
    register means for storing the signals obtained during each sampling of said sampling means;
    comparator means for comparing the signals obtained by said sampling means during each sampling with the signals stored in said register during the preceding sampling;
    interrupt request means operable to generate an interrupt request to said computer in response to an inequality signal from said comparator means; and
    means responsive to acknowledgment of said interrupt request by said computer to transfer data from said signal-generating discrete devices to said computer.

2. A discrete controller for interfacing between a computer and a plurality of discrete devices, said discrete controller comprising:
    a plurality of line drive cards each interfacing with a respective plurality of computer-switchable discrete devices;
    a plurality of line receiver cards each interfacing with a respective plurality of signal-generating discrete devices;
    a control module interfacing between said computer and said line driver and line receiver cards; wherein said line driver cards each comprise:
    a plurality of flip-flops each having two inputs and an output;
    a common conductor connected to one input of each of said flip-flops on a given line driver card;
    common connecting means connecting the other input of each of said flip-flops to the corresponding inputs of the corresponding flip-flops on all of said line driver cards and to said computer;
    output means connecting the output of each of said flip-flops to drive a respective computer-controlled discrete device; and
    gating means connected to receive decoded address designations and responsive to a particular address designation to pass a signal to said flip-flops via said common conductor.

3. A discrete controller for interfacing between a computer and a plurality of discrete devices, said discrete controller comprising:
    a plurality of line driver cards each comprising:
    a plurality of flip-flops each having two inputs and an output;
    a common conductor connected to one input of each of said flip-flops on a given line driver card;
    common connecting means connecting the other input of each of said flip-flops to the corresponding inputs of the corresponding flip-flops on all of said line driver cards and to said computer;
    output means connecting the output of each of said flip-flops to drive a respective computer-controlled discrete device; and
    gating means connected to receive decoded address designations and responsive to a particular address designation to pass a signal to said flip-flops via said common conductor;
    a plurality of line receiver cards each comprising:
    means responsive to sampling by the computer of the signals from a plurality of signal-generating discrete devices;
    register means for storing the signals obtained during each sampling of said sampling means;
    comparator means for comparing the signals obtained by said sampling means during each sampling with the signals stored in said register during the preceding sampling;
    interrupt request means operable to generate an interrupt request to said computer in response to an inequality signal from said comparator means;
    means responsive to acknowledgment of said interrupt request by said computer to transfer data from said signal-generating discrete devices to said computer; and
    a control module interfacing between said computer and said line driver and line receiver cards, said control module comprising:
    a counter connected to receive command words from said computer;
    a decoder connected to sequentially receive said command words from said counter as said counter is clocked and serving to decode the address designations of a particular discrete device to be involved in a data transfer with said computer and to apply a signal to the appropriate one of said line driver or line receiver cards to couple said particular discrete device to said computer.

4. The device of claim 3 wherein:

said decoder applies its signals to said gating means on said line driver cards and to said responsive means on said line receiver cards.

5. The device of claim 3 wherein:
each of said line driver cards interfaces with up to sixteen computer-controlled discrete devices.

6. The device of claim 3 wherein:
each of said line receiver cards interfaces with up to sixteen signal-generating discrete devices.

7. The device of claim 3 wherein:
said plurality of line driver cards is up to 128.

8. The device of claim 3 wherein:
said plurality of line receiver cards is up to 128.

9. The device of claim 3 wherein:
said plurality of line driver cards is up to 128;
said plurality of line receiver cards is up to 128; and
each of said line driver and line receiver cards interfaces with up to sixteen respective discrete devices.

* * * * *